United States Patent [19]
Schottenfeld

[11] Patent Number: 5,707,903
[45] Date of Patent: Jan. 13, 1998

[54] DECORATIVE NON-SLIP LINER

[75] Inventor: Herbert S. Schottenfeld, Altharetta, Ga.

[73] Assignee: Griptex Industries, Inc., St. Louis, Mo.

[21] Appl. No.: 785,882

[22] Filed: Jan. 21, 1997

Related U.S. Application Data

[63] Continuation of Ser. No. 578,986, Dec. 27, 1995, abandoned.

[51] Int. Cl.$^6$ .................................................. B32B 3/10
[52] U.S. Cl. .................. 442/30; 442/43; 442/27; 442/55; 442/56; 442/58; 428/311.1; 428/319.3; 428/318.4; 428/138
[58] Field of Search ................. 442/30, 43, 27, 442/55, 56, 58; 428/311.1, 317.1, 317.9, 319.3, 318.4, 131, 137, 138

[56] References Cited

U.S. PATENT DOCUMENTS

| | | | |
|---|---|---|---|
| 922,703 | 5/1909 | Knapp | 428/137 |
| 1,499,166 | 6/1924 | Frazier | 428/311.1 |
| 2,622,039 | 12/1952 | Bingell | |
| 3,360,422 | 12/1967 | Desch | |
| 3,620,890 | 11/1971 | Kemmler | |
| 3,804,700 | 4/1974 | Hoey | |
| 3,891,487 | 6/1975 | Hoey | |
| 3,911,186 | 10/1975 | Trotman | |
| 3,933,548 | 1/1976 | Anderson et al. | |
| 4,137,356 | 1/1979 | Shoemaker et al. | 428/211 |
| 4,329,386 | 5/1982 | Samowich | |
| 4,385,090 | 5/1983 | Sims | 428/121 |
| 4,409,275 | 10/1983 | Samowich | |
| 4,756,951 | 7/1988 | Wang et al. | |
| 4,863,782 | 9/1989 | Wang et al. | |
| 5,120,587 | 6/1992 | McDermott et al. | |
| 5,346,278 | 9/1994 | Dehondt | 297/219.1 |

*Primary Examiner*—Kathleen Choi
*Attorney, Agent, or Firm*—Senniger, Powers, Leavitt & Roedel

[57] ABSTRACT

A laminated liner comprising a non-slip pad and a sheet covering. The non-slip pad has opposite first and second faces and a plurality of open cells extending through the pad from the first face to the second face. The pad is formed of a frictionalizing material to grip the surface for resisting movement in the plane of the surface when the second face contacts the surface. The sheet covering also has opposite first and second faces. The sheet covering second face is permanently bonded to the non-slip pad first face.

7 Claims, 3 Drawing Sheets

1

DECORATIVE NON-SLIP LINER

This is a continuation of application Ser. No. 08/578,986 filed on Dec. 27, 1995, now abandoned.

BACKGROUND OF THE INVENTION

This invention relates generally to a flexible laminated liner having a non-slip side and a decorative side opposite the non-slip side.

In the past, various liners have been made for covering surfaces to protect the surfaces and improve their appearance. One such liner is commonly referred to as shelf paper even though it may be used on surfaces other than shelves and may be made of thin materials other than paper. For example, the shelf paper may be used to line drawers and may be made of vinyl sheet rather than paper. Frequently, the shelf paper is decorated on one side with a solid color or a design, and an adhesive is applied to the other side of the paper so that the paper may be adhered to the surface it covers. Although the shelf paper usually improves the appearance of the surface to which it is applied, it sometimes leaves a permanent residue or a mark on the surface when it is removed because of the adhesives used and their interaction with the surface and the surrounding environment. For instance, sunlight or grease may chemically change the adhesive and cause a mark. Further, because the shelf paper is made from thin sheet material, it offers very limited protection for preventing damage to the surface to which it is applied. Thus, sharp objects may penetrate the paper and scratch the surface. In addition, falling objects may dent the surface because the thin sheet material used in making the shelf paper does not provide significant cushion.

SUMMARY OF THE INVENTION

Among the several objects of this invention may be noted the provision of a liner having a non-slip side and a decorative side; the provision of such a liner which is padded; the provision of such a liner which will stay in place, but which will not leave residue on surfaces to which it is applied; the provision of such a liner which is easily removed from a surface to which it is applied; the provision of such a liner which is reusable; and the provision of such a liner which may be temporarily removed from a surface, cleaned with liquid cleaners and reapplied to the surface.

Briefly, the laminated liner of this invention comprises a non-slip pad and a sheet covering. The non-slip pad has opposite first and second sides and a plurality of open cells extending through the pad from the first side to the second side. The sheet covering also has opposite first and second sides. The sheet covering second side is permanently bonded to the non-slip pad first side.

Other objects and features of this invention will be in part apparent and in part pointed out hereinafter.

BRIEF DESCRIPTION OF THE DRAWINGS

Corresponding parts are designated by corresponding reference characters throughout the several views of the drawings.

DETAILED DESCRIPTION OF THE PREFERRED EMBODIMENT

Figure 1:
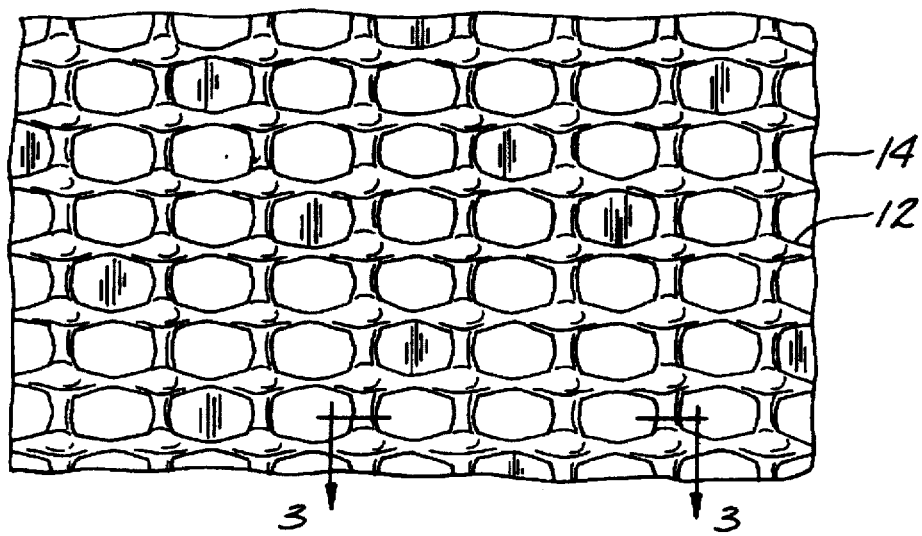
FIG. 1 is a fragmentary bottom plan of a preferred embodiment of a liner of the present invention.
Figure 3:
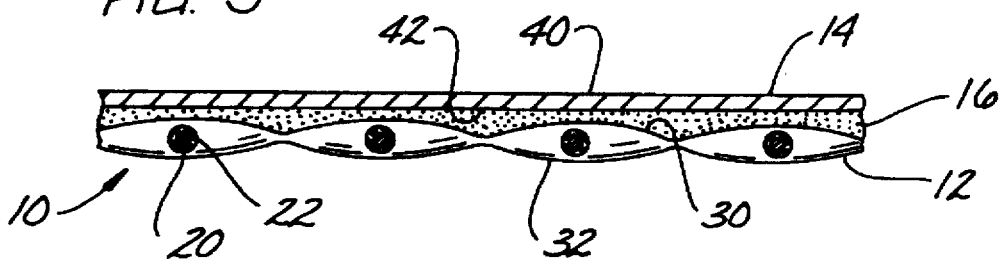
FIG. 3 is a cross section of the liner taken in the plane of line 3—3 of FIG. 1.

Referring now to the drawings, and first more particularly to FIG. 1, a flexible, laminated liner incorporating the present invention is generally indicated by the reference numeral 10. As best seen in FIG. 3, the liner 10 is comprised of a non-slip pad 12 having a decorative sheet covering 14 bonded to the pad by a layer of adhesive 16 or the like.

Figure 5:
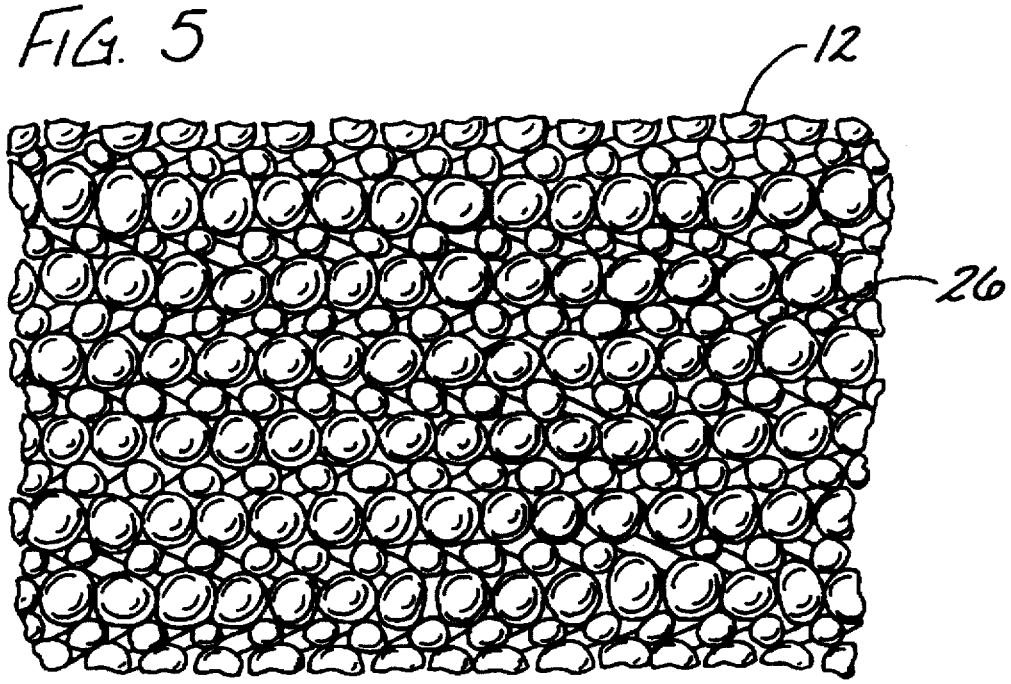
FIG. 5 is a fragmentary bottom plan of the non-slip pad of a second embodiment of the liner.

In the preferred embodiment, the non-slip pad 12 is of the type formed from a scrim 20 coated with a polyvinyl chloride (PVC) foam 22. The scrims 20 are made of natural or synthetic fibers which are either knitted or woven into a network having intermittent openings spaced along the surface of the scrim. The openings are uniformly spaced along the scrim 20 in a repeating pattern. In a second embodiment (FIG. 5), the openings may be randomly spaced. Further, the scrim network openings may be rectangular as shown or they may be other shapes, including diamonds, triangles, octagons or combinations of the these shapes.

Figure 4:
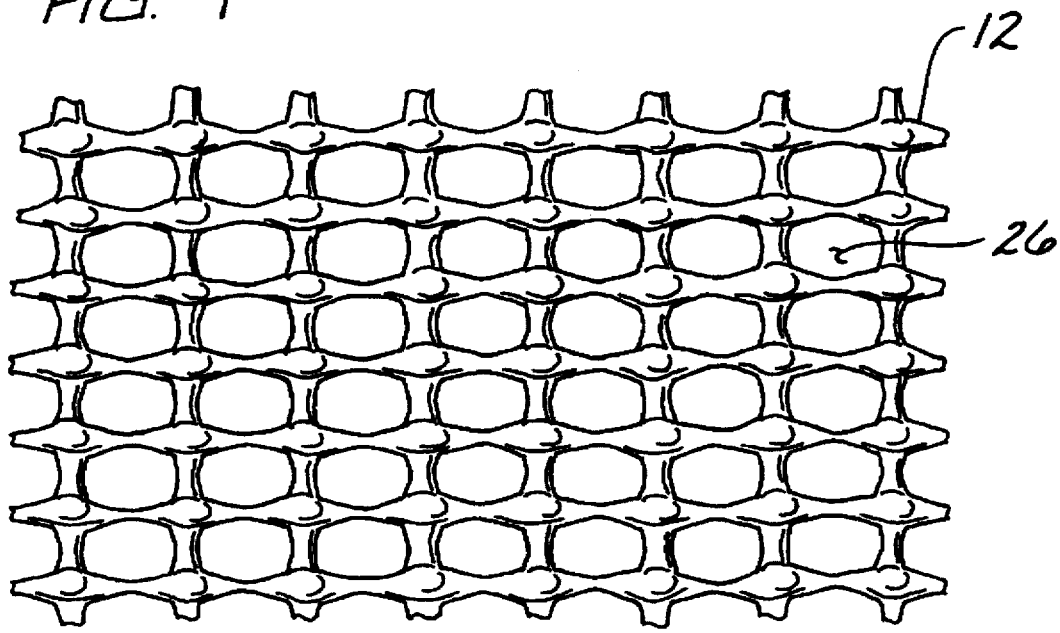
FIG. 4 is a fragmentary bottom plan of a non-slip pad of the preferred embodiment.
Figure 6:
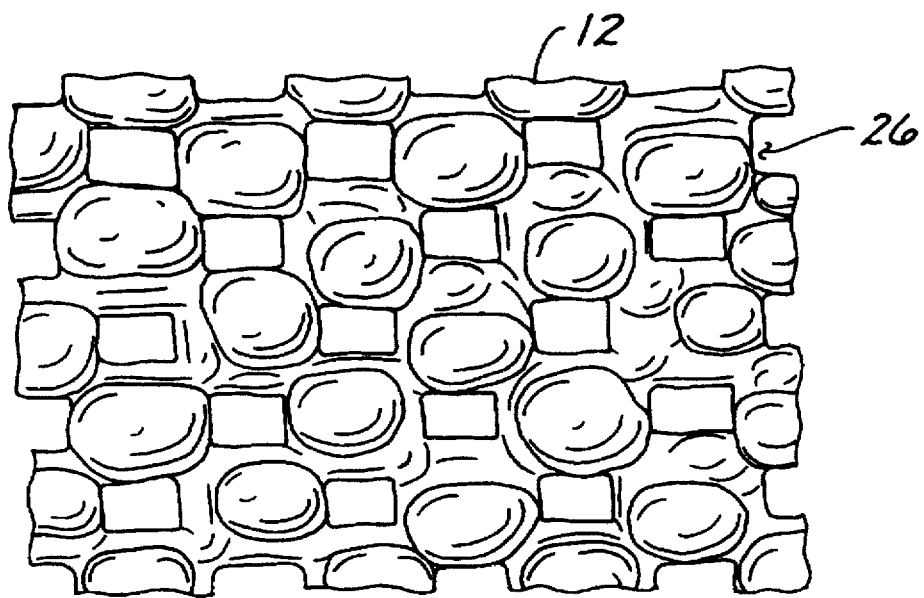
FIG. 6 is a fragmentary bottom plan of the non-slip pad of a third embodiment of the liner.
Figure 7:
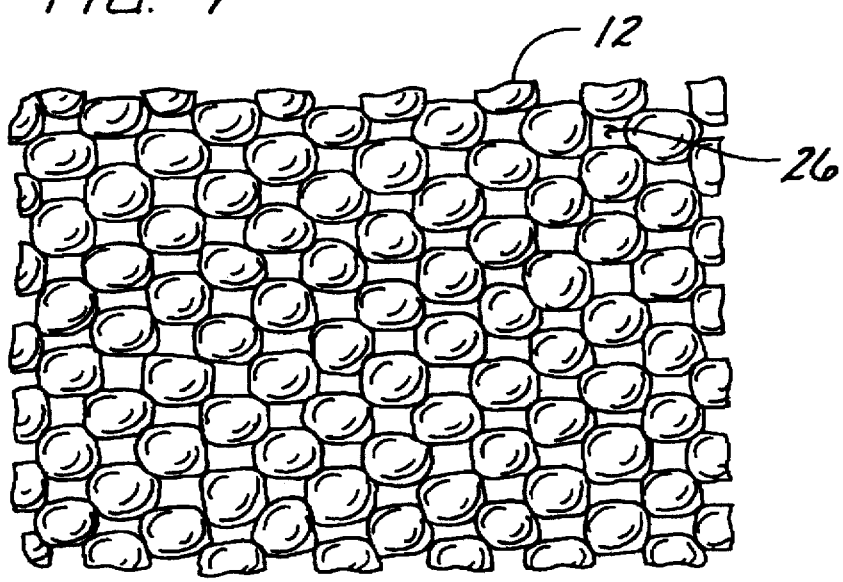
FIG. 7 is a fragmentary bottom plan of the non-slip pad of a fourth embodiment of the liner.

The pad 12 is formed by dipping the scrim 20 in liquid PVC and curing the dipped scrim in an oven. While being cured, a chemical reaction causes gas to be entrained in the PVC as it solidifies thereby causing voids in the PVC. When the PVC solidifies entirely, the voids remain in the PVC to produce a soft, resilient, elastomeric, foam material. The resulting flexible pad 12 has generally uniform open cells 26 corresponding to the openings in the scrim 20. However, because the PVC increases in volume as it cures, the open cells 26 of the pad 12 are smaller than the openings in the scrim 20 and the thickness of the pad is greater than the scrim. The sheet-like pad 12 has opposite faces 30, 32, and the open cells 26 extend entirely through the pad from the face 30 which is bonded to the sheet covering 14 to the face 32 opposite the sheet covering. Different colors of PVC (including black and white) may be used to make different colored pads 12. Pads 12 of this type are well-known in the art and will not be described in further detail. Although similar pads 12 are sold under many different trademarks, pads used in the preferred embodiments are sold by Griptex, Industries Inc. of Calhoun, Ga., under the trademarks, OMNI-GRIP, MAXI-GRIP, ULTRAGRIP, AIRE-GRIP and LOC-GRIP. An OMNI-GRIP pad 12 is shown in FIG. 4. MAXI-GRIP, ULTRA-GRIP and AIRE-GRIP pads 12 are shown as second through fourth embodiments in FIGS. 5–7, respectively. Each of these pads 12 is made with differently shaped scrims 20 using the process described above.

Foam pads 12 produced by the process described above have several advantageous properties. The foam pads are light weight and low in cost. Further, the foamed PVC is a high friction material which resists sliding across adjacent surfaces even where the adjacent surfaces are very smooth. Thus, adhesives are not required to prevent the pads from sliding when used on smooth surfaces. In addition, the scrim used in the pads increases the tensile strength of the pads so that they are stronger than foamed PVC sheets without scrim.

Figure 2:
FIG. 2 is a fragmentary top plan of the liner.

The decorative covering 14 may be made of any sheet material such as paper, cloth, polyethylene or PVC sheet, or it may be made of a combination of these materials. Regardless of the composition of the covering, it is a generally continuous sheet material having opposite sides 40, 42. Although the sheet material is flexible in the preferred embodiment, rigid material may be used in other embodiments. The material may incorporate a decorative marking or design 44 (FIG. 2) on the side 40 opposite the non-slip pad 12. The design 44 may include a paisley print as shown or it may include stripes, plaids, floral prints or other designs. Alternatively, the sheet material may be solidly colored (including white and black) throughout from the side 42 adjacent the pad 12 to the side 40 opposite it. In the solidly colored embodiment, the decoration comprises the solid color.

Numerous types of adhesives may used in the adhesive layer 16 depending upon the materials employed in the non-slip pad 12 and sheet covering 14, the anticipated environment of the liner 10, and the desired characteristics of the product. These types of adhesives include water-based, latex-based, solvent-based and acrylic-based adhesives. Further, portions of the non-slip pad 12 or the sheet covering 14 may be melted or otherwise treated to generate the adhesive layer 16.

To manufacture the liner 10, the adhesive 16 is applied to either the non-slip pad 12, the sheet covering 14 or both before the pad and covering are brought into contact. Once assembled, the adhesive 16 may require time to cure before the liner 10 is ready for use. If desired, the liner 10 temperature may be elevated during the curing step to shorten the adhesive curing time. Although the decorative features of the sheet covering 14 are applied prior to assembly in the preferred embodiment, the features may be applied to the covering after assembly in another embodiment. It will be appreciated that the method of manufacture described above may be mechanized and performed as a continuous, automated process.

The finished liner 10 may be rolled on a tube for shipment or it may be shipped as standard size flat sheets. Either shipment configuration allows the consumer to cut the liner 10 to any size for use. One such use is instead of adhesively backed shelf paper for covering shelves and drawers. In this use, the non-slip pad 12 of the liner 10 is placed against the surface of the shelf so that the foamed PVC grips the shelf surface to resist movement of the liner across the shelf surface. Thus, in contrast to most prior art shelf papers, no adhesive is required to apply the liner 10 to the shelf to hold it in place. Further, the foamed PVC provides cushioning to prevent damage to articles stored on the shelves and to prevent damage to the shelves from articles falling on them. The liner 10 is also thicker than prior art shelf papers so that the articles are less likely to penetrate the product and damage the shelf. In addition, the foam dampens vibration so that articles having uneven bases are less likely to vibrate and rattle against the shelf and against one another with the liner 10 than with prior art shelf papers.

Another advantage of the liner 10 is its ability to be removed for thorough cleaning. Prior art shelf papers (not shown) generally could not be removed and cleaned without damaging their adhesive ability. Therefore, the prior art papers could not be cleaned and reused, but were removed and replaced when soiled. However, the liner 10 of the present invention does not have an adhesive surface and the non-slip properties of the pad 12 are not permanently affected by moisture. Thus, the liner 10 may be removed when soiled, thoroughly cleaned with liquid cleaners and returned to service. Because the liner is cleanable and reusable, the long-term cost of the product can be less than prior art papers. Further, these advantages of the liner 10 over prior art shelf paper are achieved without sacrificing the aesthetic qualities of the shelf paper because the sheet covering 14 incorporates decorative markings.

The liner 10 also has advantages over non-slip pads without sheet covering 14. The open cells of non-slip pads without covering allow debris and small objects to fall through the cells and become lodged in the pads. However, because the liner 10 includes the sheet covering 14 which covers the open cells of the pads 12, the opportunity for debris and small objects to fall into the cells is eliminated. Thus, the liner 10 is less likely to become soiled than are non-slip pads without sheet covering. Further, the liner 10 presents a substantially flat upper side 42 as opposed to the uneven surface presented by non-slip pads without covering. Therefore, the stability of objects placed on the upper surface of the liner 10 is improved over that of objects placed on the non-slip pad without covering.

While the present invention has been described by reference to a specific embodiment, it should be understood that modifications and variations of the invention may be constructed without departing from the scope of the invention defined in the following claims.

What is claimed is:

1. A laminated liner for covering a generally smooth surface, the liner comprising:

a non-slip pad comprising a foamed-polyvinyl-chloride-coated scrim for increasing a tensile strength of the pad, the pad having opposite first and second faces and a plurality of open cells extending through said pad from the first face to the second face, said pad second face constituting a frictionalized face adapted to grip the surface for resisting movement of the pad in the plane of the surface when the second face contacts the surface, said frictionalized face being free of adhesive substances; and a sheet a sheet covering having opposite first and second faces, said sheet covering second face being permanently bonded to said non-slip pad first face.

2. The liner as set forth in claim 1 wherein said sheet covering is adhesively bonded to said non-slip pad.

3. The liner as set forth in claim 1 wherein said sheet covering includes a decorative marking on the first face.

4. The liner as set forth in claim 1 wherein said pad absorbs shock and cushions articles placed on the first face of the sheet covering.

5. A liner as set forth in claim 1 wherein the liner is adapted for non-destructive removal from the surface so that the pad may be placed in gripping engagement on another surface.

6. The liner as set forth in claim 5 wherein the liner is cleanable without reducing the resistance to movement of the pad in the plane of the surface.

7. The liner as set forth in claim 1 wherein said sheet covering comprises vinyl.

* * * * *

UNITED STATES PATENT AND TRADEMARK OFFICE
CERTIFICATE OF CORRECTION

PATENT NO. : 5,707,903
DATED      : January 13, 1998
INVENTOR(S): Herbert S. Schottenfeld It is certified that error appears in the above-indentified patent and that said Letters Patent is hereby corrected as shown below:

Column 4, claim 1, line 42, "a sheet a sheet" should read ---a sheet---.

Signed and Sealed this

Twenty-eighth Day of April, 1998

Attest:

BRUCE LEHMAN

Attesting Officer    Commissioner of Patents and Trademarks